Oct. 18, 1966  D. PIETROROIA  3,279,629
GATE-LIFT APPARATUS
Filed Sept. 7, 1965  2 Sheets-Sheet 1
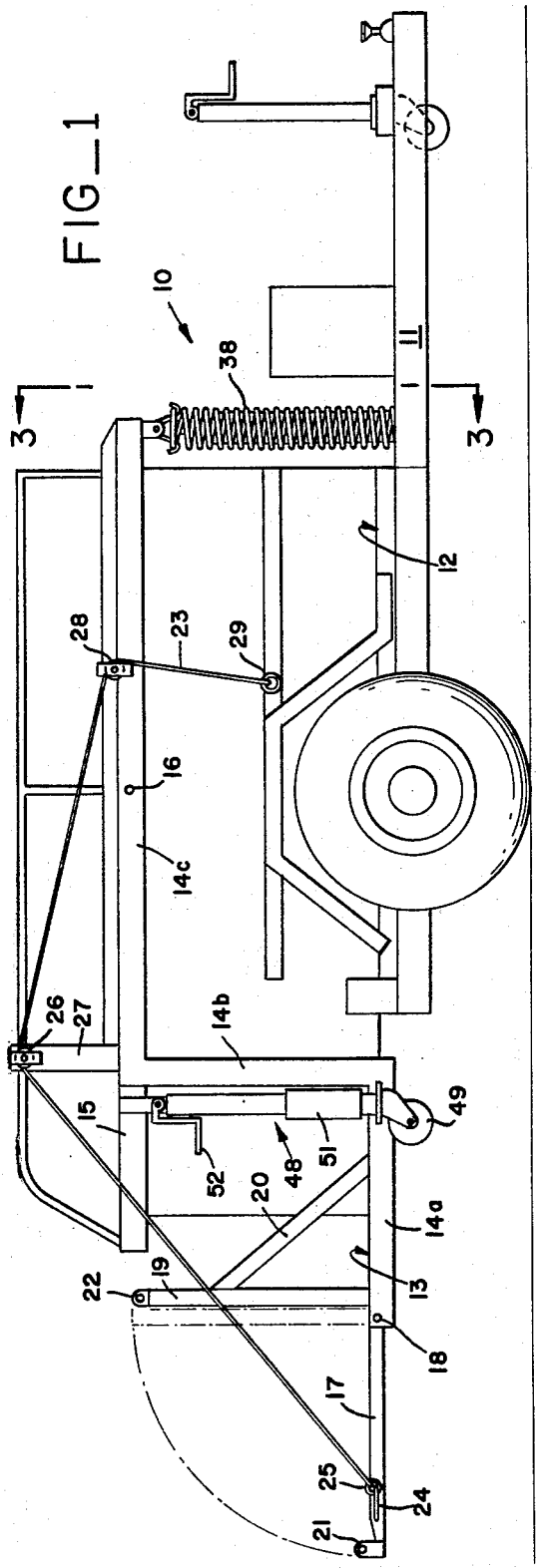
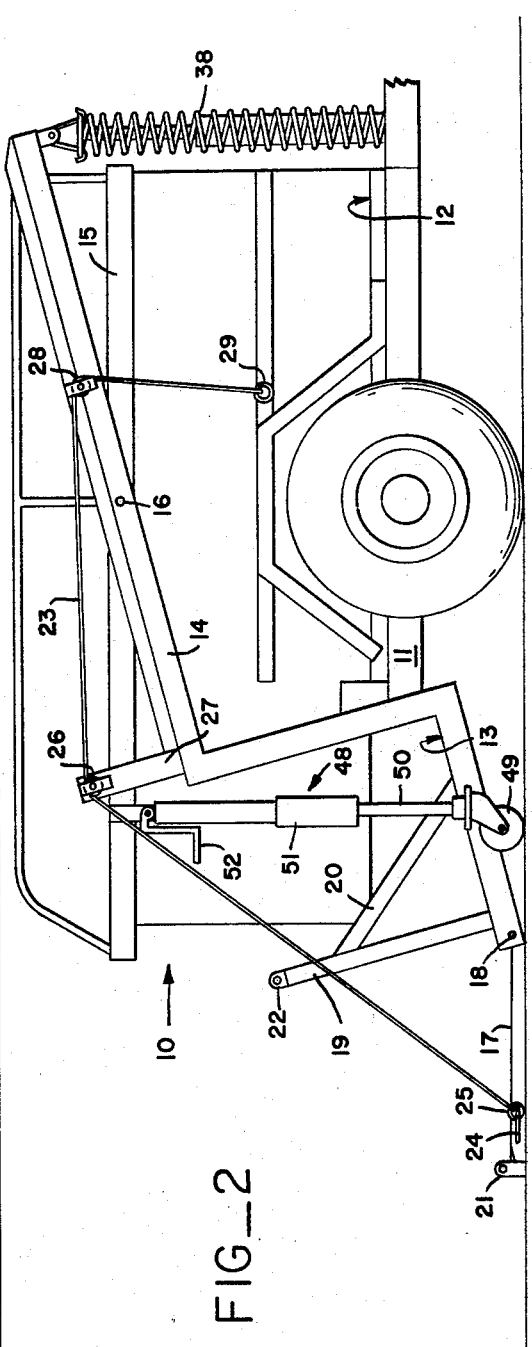
INVENTOR.
DOMINIC PIETROROIA
BY
*Mellin, Moore + Weissenberger*
ATTORNEYS

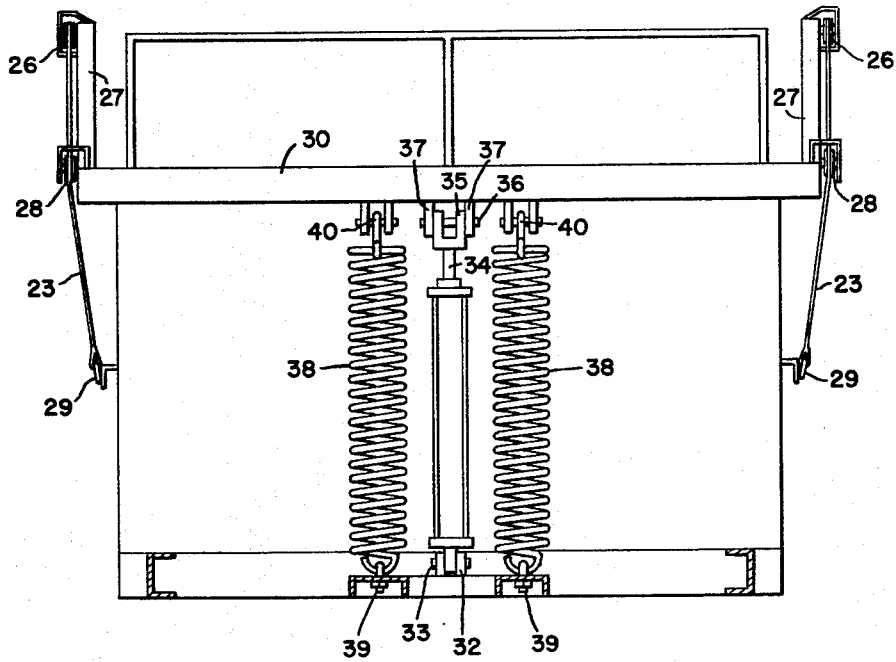
FIG_3
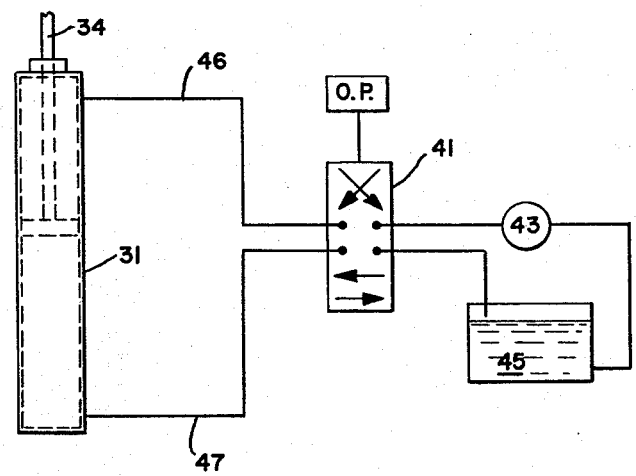
FIG_4

United States Patent Office 3,279,629
Patented Oct. 18, 1966

3,279,629
GATE-LIFT APPARATUS
Dominic Pietroroia, 138 30th Ave., San Mateo, Calif.
Filed Sept. 7, 1965, Ser. No. 485,467
3 Claims. (Cl. 214—77)

This invention relates to a lifting platform for a carrier such as a trailer. It is a continuation-in-part of my copending application entitled Vertical Gate Lift Apparatus, filed Jan. 13, 1964, and assigned Ser. No. 337,456.

It has long been convenient, if not necessary, to provide some means for lifting objects from ground level to the bed of a trailer, truck, or other carrier. Such a means is particularly useful in connection with appliances, such as a refrigerator. Although apparatus for lifting objects from ground level to the bed of a carrier is known in the prior art, the apparatus is generally expensive and complicated, and not easily added to an existing trailer or other carrier.

Accordingly, the present invention has among its objects:

To provide relatively simple and economical apparatus for lifting objects from ground level to a carrier bed, To provide a gate-lift mechanism that may be easily and conveniently fitted to a carrier made initially without such a mechanism, To provide a vertical gate-lift mechanism for use in connection with a carrier wherein the carrier tail gate is maintained in a horizontal plane throughout the vertical lift, and To provide a vertical gate-lift for a carrier which utilizes a carrier bed extension and means for arcuately raising said extension from ground level to the level of the carrier bed.

Each of the objects is fulfilled by the specific embodiment which appears in the drawings, wherein:

FIG. 1 is a side view of the gate-lift apparatus and shows the apparatus in an elevated or "up" position.

FIG. 2 is a side view that shows the gate-lift apparatus in a lowered or "down" position.

FIG. 3 is a sectional view taken on the line 3—3 of FIG. 1.

FIG. 4 is a schematic diagram of the hydraulic system for raising and lowering the gate-lift apparatus and locking it in position.

The structure which comprises the present invention appears primarily in FIGS. 1-3. With particular reference to FIG. 1, the apparatus is shown in combination with a trailer 10 having a frame 11 and a bed 12. The gate-lift apparatus includes a bed extension 13 which, though not shown directly, extends from one side of the trailer to the other. A pair of bed extension arms 14 are secured to each side of bed extension 13 and include a lower horizontal portion 14a, an integral intermediate vertical portion 14b, and an integral upper horizontal portion 14c. The upper horizontal portion 14c is pivotally mounted to a side frame member 15 of trailer 10 by means of kingpin 16. Thus bed extension arms 14 are pivotable about the axis of kingpin 16, and bed extension 13 is arcuately movable from the position shown in FIG. 1 to the position shown in FIG. 2, and vice versa. In the position shown in FIG. 1, bed extension 13 lies in the plane defined by trailer bed 12, and accordingly any object on bed extension 13 may be smoothly transferred to trailer bed 12.

The tail gate 17 is pivotally mounted to the lower horizontal portion 14a of bed extension arms 14 at pins 18. It is therefore pivotable about the axis of pins 18 and may assume a vertical position as shown (with hidden lines) in FIG. 1. Tail gate 17 may be secured in a vertical position by means of tail gate bracket 19. Tail gate bracket 19 is fixed to the lower horizontal portion 14a of bed extension arms 14 and braced in that position by bracing member 20. Tail gate bracket 19 therefore moves arcuately as bed extension 13 moves arcuately. In the vertical position, tail gate 17 is secured to tail gate bracket 19 through the use of tail gate ear 21, which is removably pinned to tail gate bracket ear 22.

Means, which utilizes cable 23, for maintaining tail gate 17 in a horizontal position throughout the arcuate movement of bed extension 13 is provided. Cable 23 is secured to bracket 24 on tail gate 17 by means of ring 25. It extends upwardly to pulley 26, which is rotatably mounted in bracket 27 fixed to the upper horizontal portion 14c of bed extension arms 14. From pulley 26, cable 23 extends across kingpin 16 and through pulley 28, which is rotatably mounted to the upper portion 14c of bed extension arms 14. From pulley 28 cable 23 extends downwardly and is secured to frame 11 of trailer 10 by means of ring 29.

The length of cable 23 is chosen so that when bed extension 13 is in the "up" position, as shown in FIG. 1, tail gate 17 is horizontal. The position of pulley 28 on upper horizontal portion 14c of bed extension arms 14 may be adjusted so that tail gate 17 remains in a horizontal position throughout the arcuate travel of bed extension 13. Cable 23 therefore provides a relatively simple and convenient means for maintaining tail gate 17 in a horizontal position. Thus an object may be placed upon tail gate 17 and lifted upwardly without danger of sliding off.

Bed extension arms 14 are connected by the horizontal member 30 which appears in FIG. 3. Hydraulic cylinder 31 extends from horizontal member 30 to trailer frame 11 and provides means for pivoting bed extension arms 14 about kingpins 16. Hydraulic cylinder 31 is pivotally connected to frame 11 by means of bracket 32 and pin 33. Connecting rod 34 is also pivotally connected by means of U-bracket 35, pin 36, and bracket 37 to horizontal member 30. Springs 38, though nonessential, extend from frame 11 at eye-bolts to the bracket and pin connection 40 secured to horizontal member 30. Springs 38 are in tension and assist hydraulic cylinder 31 in lowering horizontal member 30 (thereby raising bed extension 13), which is desirable when a heavy load is being elevated on tail gate 17.

Connecting rod 34 of hydraulic cylinder 31 has a stroke in excess of the length of the arcuate movement of horizontal member 30 to ensure that tail gate 17 and bed extension 13 may be moved from the position shown in FIG. 2 to the position shown in FIG. 1, and vice versa. The stroke of connecting rod 34 may also be utilized to elevate horizontal member 30 and accordingly lower bed extension 13 to the point where bed extension 13 lifts trailer 10 and thereby operates as a jack.

The hydraulic system for operating hydraulic cylinder 31 appears schematically in FIG. 4. A three-way valve 41 of conventional design is provided intermediate cylinder 31 and reservoir 42. Pump 43 is provided between valve 41 and reservoir 42 as shown. Valve 41 assumes one of three positions. The position shown in FIG. 4 locks the piston 44 of hydraulic cylinder 31 in position, since it prevents the flow of hydraulic fluid 45 in lines 46 and 47. Accordingly, connecting rod 34 is locked in position and bed extension arms 14 and bed extension 13 are likewise locked in position.

The "cross" position of valve 41 causes piston 44 to move upwardly in cylinder 31 as pump 43 is operated, since hydraulic fluid is forced into cylinder 31 below piston 44 in line 47.

The third or "parallel" position of valve 41 forces piston 44 downward in cylinder 31, since hydraulic fluid 45 is forced by pump 43 into cylinder 31 above piston 44 through line 46.

Valve 41 is set in the "cross" position to lower bed extension 13 and tail gate 17. It is set in the "parallel" position to raise tail gate 17 and bed extension 13. It is readily understood, however, that the positions of valve 41 may be reversed with respect to raising and lowering bed extension 13 merely by reversing the direction of pump 43 or interchanging the connection of lines 46 and 47.

Vertically adjustable supports 48 may be provided to aid in keeping trailer 10 stationary during the lifting process. The vertically adjustable supports 48 include casters 49 and legs 50, which are vertically adjustable in sleeve 51 by rotating crank 52.

To operate the gate-lift apparatus shown and described, valve 41 is placed in the "cross" position and pump 43 is utilized to force hydraulic fluid 45 into cylinder 31, raise piston 44, connecting rod 34, horizontal member 30, and lower bed extension 13 and tail gate 17 from the position shown in FIG. 1 to the position shown in FIG. 2. The object to be loaded on trailer 10 is then slid onto tail gate 17 and valve 41 is placed in the "parallel" position. Pump 43 then serves to force hydraulic fluid into cylinder 31 through line 46 to thereby lower piston 44, connecting rod 34, horizontal member 30, and raise tail gate 17 and bed extension 13. During the raising of tail gate 17, cable 23 maintains tail gate 17 in a horizontal position. When bed extension 13 is raised to a point which lies in the plane defined by trailer bed 12, pump 43 is shut off and the object may be conveniently slid from tail gate 17 over bed extension 13 and onto trailer bed 12.

The apparatus shown is particularly suitable for addition to a trailer initially manufactured without a gate-lift mechanism. Such a trailer can be converted to one with gate-lift capability by merely adding means to accommodate kingpins 16 and removing the existing tail gate. The apparatus of the present invention may then be conveniently added to convert the trailer. In some cases it may be necessary to reinforce the sides of the trailer to meet the stress on the sides at kingpins 16 during the lifting process.

Having thus described my invention, I claim:

1. Vertical gate-lift apparatus for a body having a frame and a bed comprising: a bed extension, a pair of bed extension arms mounted to said bed extension and pivotally mounted to said frame on opposite sides thereof to thereby define a pivot axis, a tail gate pivotally mounted in the plane of said bed extension, a pair of cables connected to said tail gate at opposite sides thereof and extending in a vertical plane to a first point above and fixed to said extension arms between said tail gate and said pivot axis and further extending across said pivot axis to a second point fixed to said extension arms and terminating at a third point fixed to said frame below said second point, said cables being slidable at said first and second points, a tail gate bracket fixed with respect to said bed extension for movement therewith, and means for securing said tail gate to said bracket in a position perpendicular to the plane of said bed extension, and a hydraulic cylinder connected to said bed extension arms and said frame, and means for actuating said cylinder to thereby pivot said arms about said pivot axis to raise and lower said bed extension.

2. Vertical gate-lift apparatus for a body having a frame and a bed comprising: a bed extension, a pair of bed extension arms mounted to said bed extension and pivotally mounted to said frame on opposite sides thereof to thereby define a pivot axis, a tailgate pivotally mounted in the plane of said bed extension, a hydraulic cylinder connected to said bed extension arms and said frame, means for actuating said hydraulic cylinder to thereby pivot said bed extension arms simultaneously for raising and lowering said bed extension, and biasing means connected to said bed extension arms and said frame for pivotally urging said arms in a direction which raises said bed extension.

3. Vertical gate-lift apparatus for a body having a frame and a bed comprising: a bed extension, a pair of bed extension arms mounted to said bed extension and pivotally mounted to said frame on opposite sides thereof to thereby define a pivot axis, a tailgate pivotally mounted in the plane of said bed extension, means for pivoting said bed extension arms simultaneously to thereby raise and lower said bed extension, and a pair of cables connected to said tailgate at opposite sides thereof and extending in a vertical plane to a first point above and fixed to said extension arms between said tailgate and said pivot axis and further extending across said pivot axis to a second point fixed to said extension arms and terminating at a third point fixed to said frame below said second point, said cables being slidable at said first and second points.

References Cited by the Examiner

UNITED STATES PATENTS

| 1,916,869 | 7/1933 | Stewart et al. | 214—77 |
| 2,350,641 | 6/1944 | Ruddock | 214—77 |
| 2,683,539 | 7/1954 | Corley | 214—77 |
| 2,696,923 | 10/1954 | Messick | 214—77 |

FOREIGN PATENTS 640,885  2/1950  Great Britain.

GERALD M. FORLENZA, *Primary Examiner.*
ROBERT G. SHERIDAN, *Examiner.*